United States Patent [19]

Kellie

[11] 4,094,575

[45] June 13, 1978

[54] HOLOGRAPHIC ARTICLE AND PROCESS FOR MAKING SAME

[75] Inventor: Truman F. Kellie, North St. Paul, Minn.

[73] Assignee: Minnesota Mining and Manufacturing Company, St. Paul, Minn.

[21] Appl. No.: 682,090

[22] Filed: Apr. 30, 1976

[51] Int. Cl.$^2$ .................. G02B 27/00; G02B 5/18
[52] U.S. Cl. .................. 350/3.67; 350/162 R
[58] Field of Search .................. 350/3.5, 162 R

[56] References Cited

U.S. PATENT DOCUMENTS

| 755,983 | 3/1904 | Wood | 350/162 R |
|---|---|---|---|
| 1,354,471 | 10/1920 | Doner | 350/162 R X |
| 3,580,655 | 5/1971 | Leith et al. | 350/3.5 |
| 3,695,744 | 10/1972 | Clay | 350/3.5 |
| 3,820,869 | 6/1974 | Bolusset et al. | 350/3.5 |
| 3,834,786 | 9/1974 | Carlsen | 350/3.5 |
| 3,917,378 | 11/1975 | Gale | 350/3.5 |

*Primary Examiner*—John K. Corbin
*Assistant Examiner*—John D. Lee
*Attorney, Agent, or Firm*—Cruzan Alexander; Donald M. Sell; William B. Barte

[57] ABSTRACT

A holographic article preferably including a plurality of superimposed and/or spatially adjacent linear gratings, each of which has a spatial frequency different from that of the other gratings. The articles are formed as a result of an interference fringe field produced by two mutually coherent light beams impinging onto an assembly of a two-dimensional transparency and a photosensitive medium.

33 Claims, 13 Drawing Figures

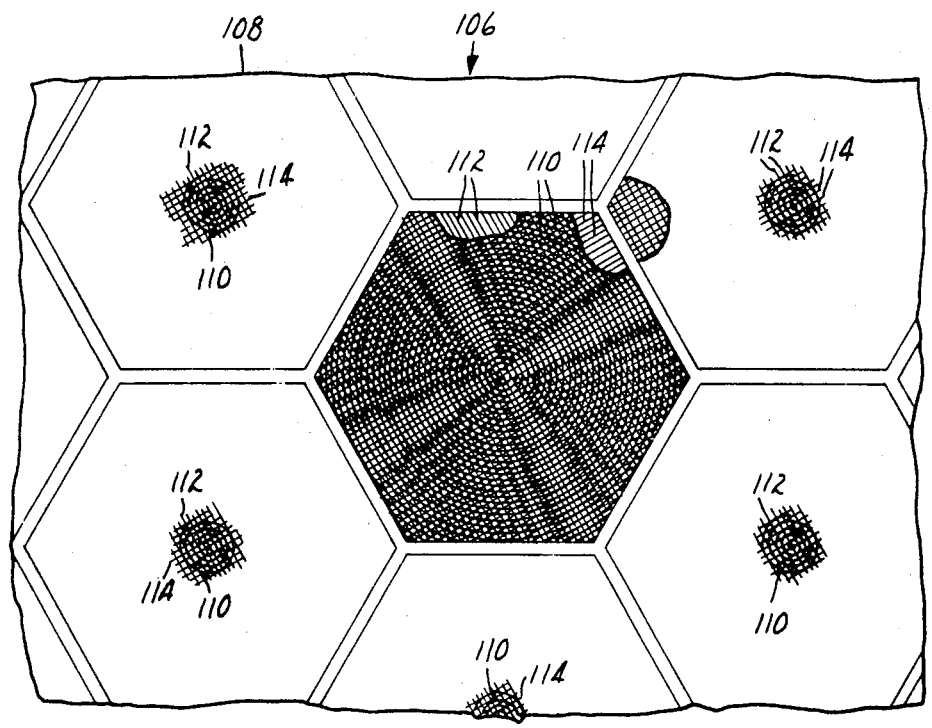
FIG. 11
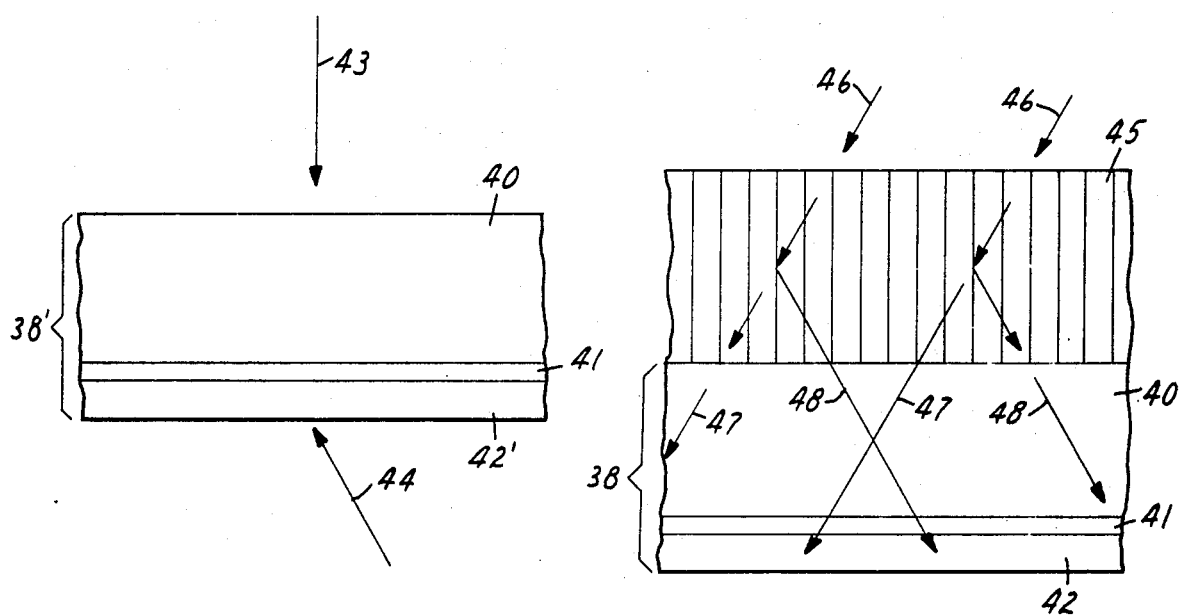
FIG. 3
FIG. 4

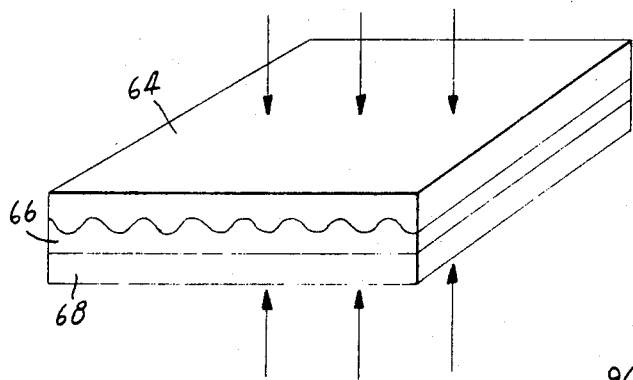
FIG. 6
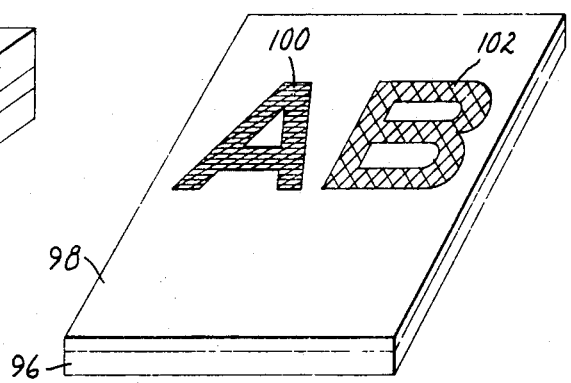
FIG. 10
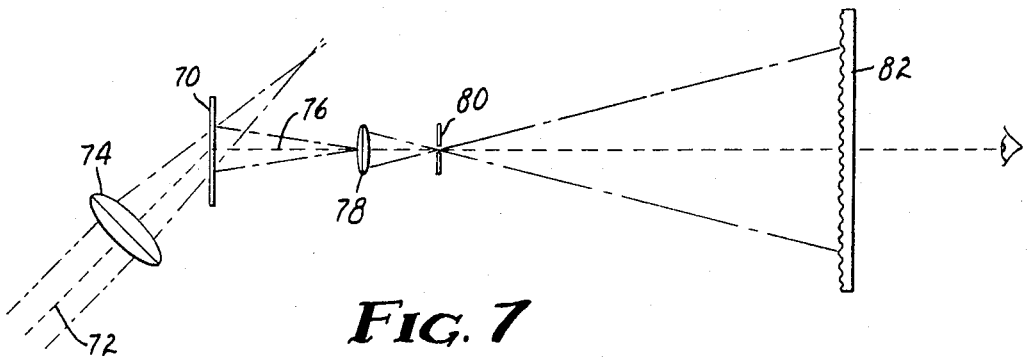
FIG. 7
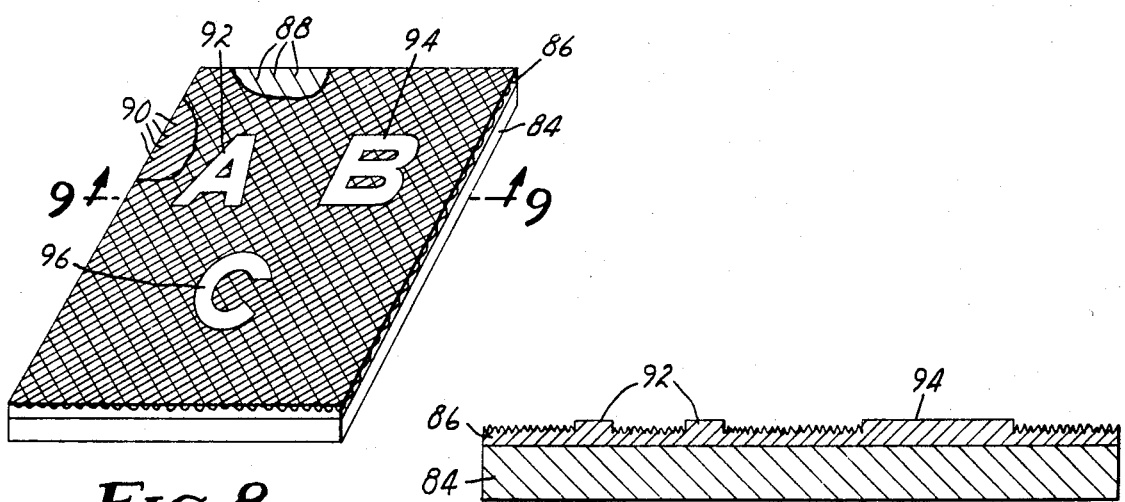
FIG. 8
FIG. 9

HOLOGRAPHIC ARTICLE AND PROCESS FOR MAKING SAME

BACKGROUND OF THE INVENTION (1) Field of the Invention

This invention relates to optical systems utilizing optical articles including focused image holograms for the storage of information, decorative applications and the like.

(2) Description of the Prior Art

The advent of holography, i.e., the technique of recording onto a photosensitive medium an interference pattern formed by a reference light beam and a second light beam coherent with the first beam and modulated by an object, has brought about a veritable revolution in optical processing. While a variety of different optical configurations are known for producing holograms, each having differing advantages and drawbacks, most prior art holographic methods suffer a common limitation of being extremely sensitive to vibration of the respective optical elements and of limited optical quality due to dust particles and the like. While techniques such as spatial filtering may minimize some of these limitations, in certain systems, such as those utilized in forming focused image holograms, such limitations are not so readily eliminated.

Nonetheless, focused image holograms are recognized as being a preferred form of interferometric recording. In U.S. Pat. No. 3,834,786 (Carlsen), a technique is disclosed for forming focused image holograms which utilizes a telecentric relay lens system in which information from an optical transparency is spatially modulated onto an object beam, passed in and out the lens system as parallel rays, thereby changing the magnification of the spatially modulated beam and thereafter coimpinged onto a photosensitive medium together with a reference beam to form the focused image hologram. In U.S. Pat. No. 3,917,378 (Gale), focused image holograms comprising superimposed parallel diffraction gratings, each modulated by a different color component, are provided as embossed patterns on a plastic medium. All such techniques suffer the same limitation in that lenses used to focus the modulated object beam onto the photosensitive medium may ultimately limit the resolution and/or spatial size of the hologram.

In an alternative technique for forming focused image holograms depicted in U.S. Pat. No. 3,820,869 (Bolusset et al), some of the disadvantages of the systems discussed above are eliminated. In the system depicted in FIG. 4 of that patent, a transparent graphic information carrying object is placed in substantial contact with a light sensitive plate and two beams of mutually coherent radiation are caused to pass through the transparent object to provide on the light sensitive plate an interference pattern which is modified by the graphic information. In that system, one of the mutually coherent beams is required to be directed normal to the plane of the light sensitive plate. The presence of optical elements such as a portion of a lens system 25 and a beam-splitting prism assembly between a spatial filter suggested to be present at a focal point of the lens system 25 and the transparency may introduce artifacts such as those produced by lens aberrations and dust. Furthermore, such a configuration limits the obtainable resolution due to shadowing effects present in a practical system in which a photographic medium having even a nominal thickness is used.

SUMMARY OF THE INVENTION

The holograms of the present invention are provided by a novel method in which the limitations imposed by the lens or other optical elements of prior art methods are avoided. In the present invention, a hologram including at least one linear grating having a preselected spatial frequency is provided by first providing a transparency containing an optically discernable pattern and by positioning a photosensitive medium in substantial contact with the transparency. Two beams of mutually coherent radiation having a predetermined wavelength are directed along non-colinear paths through separate spatial filters and thence directly onto the transparency at equal angles of incidence with respect to the plane of the transparency at the point of incidence, to form in the photosensitive medium the grating containing a holographic image of the pattern in the transparency. The absence of any optical element between the spatial filter and the transparency thus ensures that the hologram containing the formed grating is free of artifacts such as are produced by lens aberrations or dust.

A hologram of the present invention thus comprises a sheet material having a permanent, optically detectable pattern which includes at least one linear grating having a preselected spatial frequency formed as described above by the impingement of two mutually coherent beams of radiation along separate paths forming equal angles of incidence with a transparency in substantial contact with a photosensitive medium. The medium is then further processed to provide the sheet material with the permanent pattern containing the holographic image.

In a preferred embodiment, a hologram of the present invention comprises a substantially homogeneous sheet material having formed on a surface thereof an optically detectable pattern which includes a plurality of superimposed linear gratings. In this embodiment, each of the gratings has a preselected spatial frequency different from that of the other gratings. In various related embodiments, the plurality of superimposed gratings are disposed with respect to each other at a variety of angular positions and differing spatial frequency relationships.

The present invention may be utilized to form a master hologram in which color information is encoded in spatial frequency form by providing a color transparency as the optically discernable pattern and utilizing three sets of beams of coherent radiation, each providing a different primary color component. The hologram master is further processed to yield a relief image suitable for embossing low cost replica holograms which may then be advantageously used in micro-publishing applications wherein the color information may be read using an off-axis white light illumination and proper imaging of the diffracted light such as is disclosed in U.S. Pat. No. 3,834,786 (Carlsen).

In another embodiment, the holograms of the present invention are formed in a decorative article comprising a substantially homogeneous sheet material. The sheet material has on one surface thereof an optically detectable pattern which includes a linear optical interference grating modulated by an array of optical patterns. Typical such patterns may include art work corresponding to regular geometric patterns such as simulated machine turnings, graphic information superimposed onto geometric arrays, etc.

BRIEF DESCRIPTION OF THE DRAWING

FIG. 3 is a simplified schematic of a hologram recording apparatus according to another embodiment of the present invention in which the two light beams are incident on opposite sides of an assembly of a transparency and photosensitive medium;

FIG. 4 is a simplified schematic of a hologram recording apparatus according to another embodiment of the present invention in which a grating is provided in the assembly to split a single incident beam into interferring zero order and first order diffracted beams;

FIG. 6 is a schematic view of a preferred process for reproducing the holograms of the present invention;

FIG. 7 is a schematic view of a projection apparatus for displaying a reconstruction of a hologram of the present invention;

FIG. 8 is a simple example of one embodiment of a hologram of the present invention;

FIG. 9 is a cross sectional view of a section of a typical hologram such as that shown in FIG. 6;

FIG. 10 is an alternative example of another hologram of the present invention; and FIG. 11 is an expanded view of a decorative article according to one embodiment of the present invention.

DESCRIPTION OF THE PREFERRED EMBODIMENTS

Figure 1:
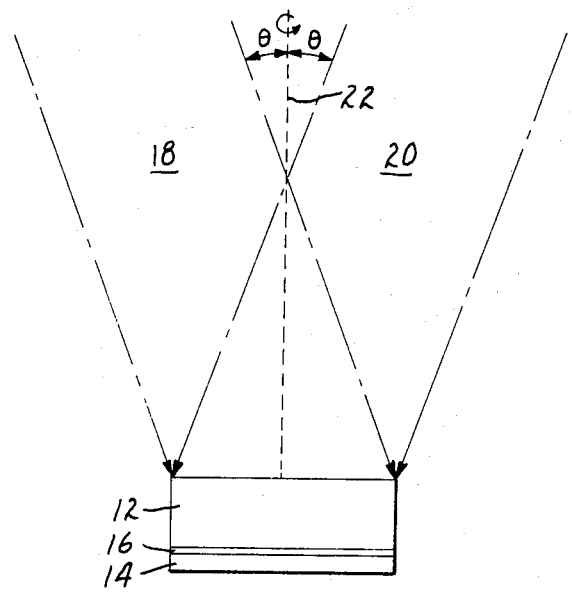
FIG. 1 is a simplified schematic view of a hologram recording apparatus according to one embodiment of the present invention.

In a preferred embodiment shown in FIG. 1, the holograms of the present invention are formed in a lensless process wherein two coherent beams of radiation impinge upon an original two-dimensional image such as a color master transparency 12 held in contact with a photosensitive medium 14. The photosensitive medium is selected to be sensitive to the radiation to be used and to such color information as may be present in the transparency 12. Conventional pan sensitized photographic emulsions may thus be used. If desired, an additional layer 16 of an index matching material such as xylene may be placed between the transparency and photosensitive medium to achieve intimate optical contact and to prevent back reflections.

Two beams of mutually coherent radiation 18 and 20 are directed onto the contacted assembly. The two beams are conveniently obtained from a single laser source which is split into two beams by a conventional beam splitting apparatus (not shown). Each beam is subsequently expanded to have a spherical wave front. The beams are then directed onto the transparency 12 from different directions, intersecting in the vicinity of the transparency to establish a substantially linear standing wave interference fringe field which is modulated by the information in the transparency. Each of the beams 18 and 20 impinge onto the transparency 12 at an angle ($\theta$) with respect to a line extending normal from the plane of the transparency. In one embodiment, the angle ($\theta$) may be the same for both beams. As is well known, the spatial frequency of the resultant standing wave fringe field is a function of the wavelength of the interfering beams and of the angle therebetween. The photosensitive medium 14 is thus exposed by the modulated interference fringe field to form a substantially linear grating in the medium which is a holographic replica of that portion of the transparency selectively transmitting the beams 18 and 20.

As described in more detail hereinafter, in a preferred embodiment, color information is recorded onto the photosensitive medium 14 via multiple exposures wherein, in the embodiment shown in FIG. 1, the beams 18 and 20 are altered to provide a different wavelength for each exposure. Preferably, three exposures may be employed, each with light corresponding to a different primary color. In this embodiment, the angle of the beams with respect to the surface of the medium 14 is maintained constant. Three superimposed gratings are thus formed, each having a different spatial frequency. In one embodiment, the assembly of the transparency 12 and medium 14 may be fixed with respect to the incident beams 18 and 20 such that all of the gratings resulting from the three exposures are parallel. Alternatively, the assembly may be rotated about the axis 22 between each exposure such that the gratings are non-parallel to each other, or the three sets of beams may be incident simultaneously, each set being directed along a different axis. The spatial frequency of intermodulation frequencies resulting from interference between the fundamental gratings is thereby increased such that they fall outside the imaging aperture of a reconstruction device such as that shown in FIG. 7.

The imaged photosensitive medium 14 may thereafter be developed by appropriate techniques according to conventional photographic processing. Preferably, such media may be used to form a master hologram which is replicated in a thermoplastic type medium.

Figure 2:
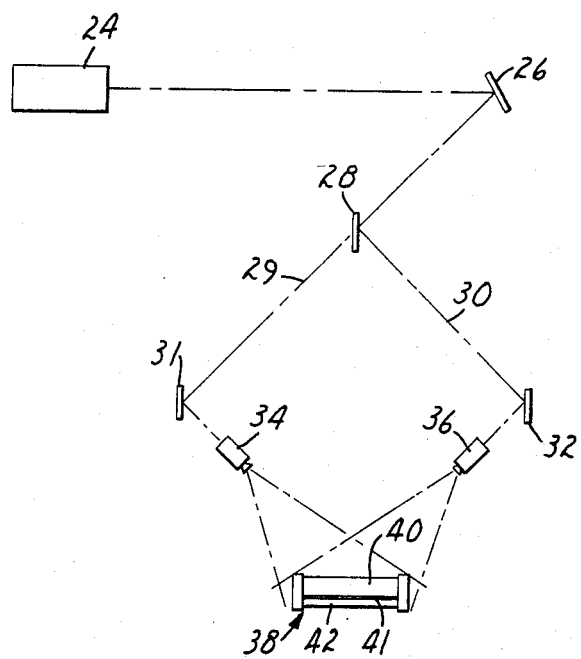
FIG. 2 is a more detailed schematic view of a hologram recording apparatus according to another embodiment of the present invention.

In the more detailed schematic of FIG. 2, a preferred apparatus for forming a hologram according to the present invention includes a laser 24 as the source of coherent radiation, such as at a wavelength of 6328 A. This light is reflected from mirror 26 and thence through a beam splitter 28 formed of a halfsilvered mirror to form two mutually coherent beams 29 and 30. The two beams 29 and 30 are reflected from mirrors 31 and 32 and pass through beam expanding spatial filters 34 and 36 such as a conventional lens pinhole spatial filter. The filters 34 and 36 ensure that effects of dust particles and other defects and impurities in the optical system are eliminated. Each beam passing through the respective filters 34 and 36 comprises a diverging beam of radiation having a spherical wave front. The beams 29 and 30 are impinged upon the assembly 38 which comprises a plate holder containing the transparency 40, an index matching liquid 41, and the photosensitive medium 42. As discussed in conjunction with FIG. 1, the substantially linear interference fringe field resulting upon the intersection of the two beams is modulated by the information in the transparency 40. This modulated interference fringe field exposes the photosensitive recording medium 42 which may be developed to form a diffraction grating containing the modulated information.

In a preferred embodiment, wherein a plurality of superimposed linear gratings is desired, the laser 24 is adjusted to provide radiation of different wavelengths such that separate sequential exposures with each of the wavelengths may be made. Accordingly, the laser 24 may be selected to be a tunable laser or may be a system including three laser sources and appropriate shutter and mirror arrangements. Such configurations are well known to those skilled in the art and need no further discussion.

As shown in FIG. 3, in an alternative embodiment, the assembly 38' is similar to the assembly 38 of FIG. 2, and differs in that the photosensitive medium 42' used in the assembly 38' may be selected to be transparent. In this embodiment, two coherent light beams 43 and 44 are impinged upon the assembly 38' from opposite sides of the assembly, and interfere to provide a standing wave interference fringe field in a manner similar to that previously discussed. In a particularly preferred embodiment, the beam 43, incident on the transparency 40, may be directed normal to the surface of the transparency, while the other beam 44 is incident at an acute angle with respect to a line extending normal from the plane of the medium. This produces an interference fringe field which is nearly parallel to the plane of the photosensitive medium. Where such a medium is a photopolymerizable material, subsequent etching of the medium will produce a blazed grating having exceptionally high first order diffraction efficiency.

In another embodiment shown in FIG. 4, the need for two separate beams such as that provided in the embodiments depicted in FIGS. 1-3 is eliminated by the use of a diffraction grating 45 placed in contact with the transparency 40. In such an embodiment, the grating 45, preferably a thick volume hologram grating, causes a single incident beam 46 to be split into zero and first order beams 47 and 48 respectively which are mutually coherent and which interfere to provide a substantially linear standing wave interference fringe field in a manner similar to that discussed hereinabove. Such an embodiment eliminates the need for vibration isolation and enables low cost holograms to be readily produced in inexpensive apparatus.

In FIG. 1, the beams of coherent radiation incident on the assembly are shown to be nondiverging, i.e., substantially parallel, while the beams in FIG. 2 are shown diverging. The gratings of the present invention are presumed to be substantially linear, hence it is assumed that the sources of radiation are sufficiently remote from the assembly of the transparency and the photosensitive material or are suitably processed such that substantially linear gratings are realized. Under such conditions, both beams exhibit spherical wave fronts of large radius which interfere on a planar surface and result in an interference pattern which consists of a series of straight line fringes oriented perpendicular to the plane of the drawing and having a substantially constant spatial frequency across the surface. As used herein, the term "linear grating" is intended to include such gratings as are strictly linear at the center and only quasi-linear toward the edges, the extent of such nonlinearity depending upon the remoteness of the incident radiation.

Figure 5A:
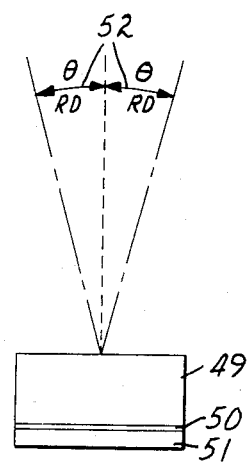
FIGS. 5A - 5C are schematic views of a hologram recording apparatus according to the present invention for use with separation color transparencies.
Figure 5B:
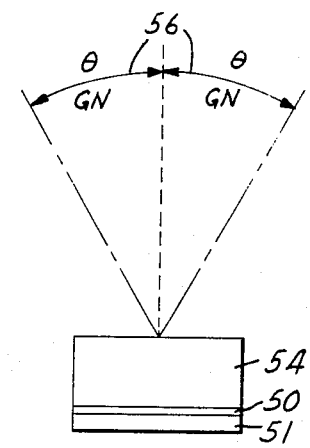
Figure 5C:
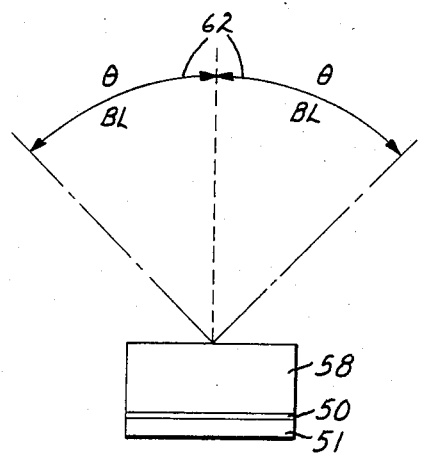

FIGS. 5A-5C show an alternative embodiment for providing a plurality of superimposed linear gratings wherein each of the gratings has a preselected spatial frequency different from that of the other gratings. In this embodiment, a color transparency, such as the transparency 12 of FIG. 1 and 40 of FIGS. 2-4, is replaced with a set of black and white color separation transparencies. As shown in FIG. 5A, a black and white color separation providing information corresponding to red information is provided in the transparency 49. The transparency 49 is assembled together with an index matching liquid 50 and an orthochromic recording medium on a suitable substrate 51. This assembly is illuminated by two beams of laser light having a predetermined wavelength $\lambda$ impinging onto the assembly at a preselected angle 52 $\theta_{RD}$ which is thereafter associated with the red information. A first linear diffraction grating is produced in the recording medium 51 which is modulated by the red information from the transparency 49. A second exposure is then provided as shown in FIG. 5B. In this figure, the black and white separation transparency 54 is selected to provide green information. The transparency 54 is assembled in register with the same orthochromic recording medium 51 used in FIG. 5A. Desirably, an index matching liquid 50 will similarly be provided. This assembly is illuminated by laser light of the same wavelength utilized in FIG. 5A. Unlike that of FIG. 5A, however, the angle 56 at which the beams impinge upon the assembly is now modified to a new preselected angle $\theta_{GN}$ which is thereafter associated with the green information. FIG. 5C shows a third exposure in which the black and white separation 58 is now selected to contain blue information. This separation is assembled with an index matching liquid 50 and the same orthochromic recording medium 51 as that used in FIGS. 5A and 5B. Two beams of laser radiation having the same wavelength $\lambda$ as that provided in FIGS. 5A and 5B are impinged upon the assembly at another preselected angle 62 ($\theta_{BL}$), which angle is thereafter associated with the blue information. In a preferred embodiment, the angle $\theta_{BL}$ is greater than that of $\theta_{GN}$ which in turn is greater than that of $\theta_{RD}$. If the smallest angle ($\theta_{RD}$) is judiciously selected such that during reconstruction the first order diffraction beam is intensified and higher order beams are suppressed, then under certain conditions, i.e., proper selection of groove depth and index of refraction, the first order efficiency may be controlled to be greater than the theoretical maximum efficiency of a thin-phase grating. As discussed hereinabove, the spatial frequency of the resulting linear gratings is a function both of the wavelength of the incident radiation and of the angle of that radiation with respect to the assembled transparency and photosensitive material. Since, in FIGS. 5A, 5B and 5C, the angle of the radiation with respect to the assembly is varied in each exposure, the spatial frequency of the resulting gratings will similarly be modified.

While any variety of photosensitive media may be used in the present invention, it is particularly preferred to use a photosensitive material which may be made to undergo a change in the optical thickness that is directly related to the intensity of the light in the stationary interference pattern during exposure. Accordingly, a high resolution photoresist material such as Type 1350J, manufactured by Shipley Co., Newton, Massachusetts, may be desirably employed. Such a material may then be developed to form a surface relief pattern corresponding to the areas of varying intensity of the exposure. For example, the material may be processed to form holograms similar to the phase relief holograms disclosed in U.S. Pat. No. 3,703,407 (Hannan et al).

FIG. 6 shows a method whereby such a surface relief hologram has been metallized to form a master hologram 64. According to conventional thermoplastic recording techniques, such a master material may be replicated into a conventional thermoplastic copy material 66 by pressing it against the master 64 under suitable heat and pressure conditions.

FIG. 7 represents a preferred embodiment for reconstructing the holograms of the present invention, i.e., those produced upon direct exposure of the two coincident beams of coherent radiation as well as those reproduced via replication techniques, such as that disclosed in U.S. Pat. No. 3,834,786 (Carlsen). In such an embodiment, a thus prepared hologram 70 is placed in an optical system such that white light passing along an axis 72 through a condensing lens 74 impinges onto the hologram 70 at a preselected angle. As is well known in holographic techniques, a diffraction pattern will thereupon be generated along a second optical axis 76 perpendicular to the hologram 70. The diffracted image is focused through a second condensing lens 78, through an aperture plate 80 and onto a viewing screen 82 such that a reconstruction of the original image on the transparency may be observed. Alternative reconstruction techniques similarly suitable for use with the holograms of the present invention are well known to those skilled in the art.

A cross sectional perspective view of a typical hologram of the present invention is shown in FIG. 8. In this figure, the hologram is shown to comprise a substrate 84 and a layer of a photoresist 86. The layer 86 is developed as described hereinabove to have on the surface thereof a plurality of linear diffraction gratings 88 and 90 respectively, which gratings are superimposed and have different spatial frequencies. Further superimposed on the gratings are graphic information such as the letters "A", "B", and "C", 92, 94 and 96 respectively, such as may be provided in the transparency shown in FIGS. 1-5.

FIG. 9 shows a typical cross sectional view of developed photoresist hologram shown in FIG. 8 taken along the line 9—9.

In an alternative embodiment, shown in FIG. 10, the holograms may comprise a substrate 96 and a layer of photoresist 98 wherein the regions encompassed by the alpha-numeric characters contain the diffraction patterns. In such an embodiment, for example, one portion of the graphic information on the original transparency such as the letter "A" would correspond to a first color, while a second portion of the transparency such as the letter "B" would be present in a different color. Upon imaging with two coherent beams of a first wavelength, as set forth in the discussion in conjunction with FIGS. 1 and 2, which wavelength corresponds to the color of the letter "A", a first linear diffraction grating 100 corresponding to the letter "A" would be formed in the photosensitive medium. A second exposure with two additional beams of a different wavelength which is selectively absorbed by the color of the letter "B" would cause the formation of a second diffraction grating 102 in which the spatial frequency is different than that formed by the grating associated with the letter "A".

The above described holograms have been found to have a variety of applications. In one such application, the hologram is desirably used in micropublishing applications wherein color microfiche such as may consist of a large number of frames (Ex. 98 frames) may be exposed and copied by the simple three exposure method of the present invention, thereby forming a master hologram. Such master holograms may subsequently be mass replicated according to conventional techniques. The resultant holographic color microfiche is useful in a reading device of the type described in U.S. Pat. No. 3,834,786 (Carlsen). In forming such a color holographic microfiche, each of the multiple exposures is made with a different wavelength radiation. The color transparency and the photosensitive medium remain fixed in constant registration throughout the exposures. Accordingly, the sets of gratings corresponding to the basic additive color information are automatically put into registration. The final result is a multi-frame color holographic microfiche matrix wherein the reconstructed color spectrum of each frame is spatially invariant with respect to the optical axis of that frame when viewed in a reading device of the type described in U.S. Pat. No. 3,834,786.

In another embodiment, the holograms of the present invention provide desirable decorative articles. In such articles, as shown in FIG. 11, the decorative article 106 may comprise an embossed plastic sheet 108 having on a surface thereof a regular geometric pattern 110 such as a simulated turning, which is repeated across the surface of the sheet 108. A typical such pattern may comprise a simulated spiral-shaped groove. Superimposed on such a pattern is at least one linear grating 112 and/or 114. For purposes of clarity, the line spacing of the gratings 112 and 114 are shown much wider with respect to the spiral spacing than would normally be provided. When such a sheet is viewed with ordinary white light, the resulting articles reveal the pattern of the simulated machine turning modified by light interference patterns due to the diffraction gratings, causing the article to exhibit a high esthetically pleasing opalescent appearance.

In providing such articles, an original of a regular geometric pattern such as a simulated machine turning may be graphically prepared. The original may then be photographically reduced and repeated via conventional step and repeat camera processes, and used to form a transparency which is then processed in the same manner as discussed in conjunction with FIGS. 1-5, to provide the embossed decorative articles.

Having thus described the present invention, what is claimed is:

1. A hologram comprising a sheet material having a permanent, optically detectable pattern which includes at least one linear grating, which grating has a preselected spatial frequency and results from the interference fringe field produced by two intersecting coherent light beams of a predetermined wavelength passing through an optical transparency in substantial contact with a photosensitive medium to impart a holographic image of said transparency in said medium, which medium is then further processed to provide said sheet material with said permanent pattern containing said holographic image, characterized by the feature that the grating is formed by two intersecting coherent light beams which are directed along non-colinear paths to pass through spatial filters and thence directly impinge onto said optical transparency at equal angles of incidence with respect to the plane of the transparency at the point of incidence, such that the formed gratings are free of artifacts such as are produced by lens aberrations or dust.

2. A hologram according to claim 1, characterized by the presence of a plurality of superimposed linear gratings, each of which has a preselected spatial frequency different from that of the other gratings, all of the gratings being similarly formed by two intersecting coherent light beams impinging onto the transparency at equal angles of incidence.

3. A hologram according to claim 2, wherein said gratings are parallel to each other.

4. A hologram according to claim 2, wherein said gratings are non-parallel to each other.

5. A hologram according to claim 2, comprising three sets of substantially linear gratings, each set having a spatial frequency corresponding to one of the three primary colors.

6. A hologram according to claim 2, comprising three sets of substantially linear gratings, each set being selected to have a spatial frequency representative of a different portion of the visible spectrum.

7. A hologram according to claim 2, wherein said material comprises a medium containing surface modulations corresponding to said plurality of gratings.

8. A hologram according to claim 7, wherein the medium comprises a substrate and a layer of developed panchromatic photoresist material coated thereon.

9. A hologram according to claim 1, characterized by the sheet material being the photosensitive medium originally exposed to the intersecting coherent light beams and further processed to render permanent the resultant holographic image.

10. A hologram according to claim 1, characterized by the sheet material having embossed thereon a replica of the holographic image formed in the photosensitive medium.

11. A decorative article comprising a substantially homogeneous sheet material having on a surface thereof a permanent optically detectable pattern which includes an array of at least two superimposed linear optical interference diffraction gratings, at least one of which gratings has a different spatial characteristic from the remaining grating and results from the interference fringe field produced by two intersecting coherent light beams of a predetermined wavelength passing through an optical transparency in substantial contact with a photosensitive medium to impart a holographic image of said transparency in said medium, which medium is then further processed to provide said sheet material with said permanent pattern containing said holographic image, modulated by another optical pattern.

12. A decorative article according to claim 11, wherein said linear gratings are orthogonally superimposed.

13. An article according to claim 11, wherein all the elements of all of said linear gratings are parallel to each other.

14. An article according to claim 11, wherein the elements of some linear gratings are disposed nonparallel with respect to the elements of other linear gratings.

15. An article according to claim 11, wherein each linear grating comprises a plurality of parallel, linear equispaced light interfering elements, the line spacing being the same in all gratings.

16. An article according to claim 11, wherein each linear grating comprises a plurality of parallel linear equispaced light interfering elements, the line spacing in some of the gratings being different from that in the other gratings.

17. An article according to claim 11, wherein said another optical pattern comprises a representation of graphic information.

18. An article according to claim 17, wherein said graphic information representation is substantially non-repetitive and extends over substantially the entire article.

19. An article according to claim 17, wherein said graphic information representation is a regular geometric pattern extending over substantially the entire article.

20. A method of forming a hologram including at least one linear grating having a preselected spatial frequency comprising the steps of
 (a) providing a transparency containing an optically discernable pattern,
 (b) positioning a photosensitive medium in substantial contact with the transparency,
 (c) directing a first beam of coherent radiation having a predetermined wavelength to impinge on said transparency at a given angle with respect to the plane of the transparency at a given point, and
 (d) directing a second beam of radiation having the same predetermined wavelength and coherent to the first beam to impinge onto said transparency at another angle with respect to the plane of the transparency at the point of impingement intersecting the first beam to form an interference fringe field in the region of intersection,
 whereby there is formed in the photosensitive medium a hologram comprising a said linear grating having an image of the interference fringe pattern amplitude modulated by the optically discernable pattern in the transparency characterized by the feature that each of both said first and second beams are directed along non-colinear paths through separate spatial filters and thence directly onto the transparency at equal angles of incidence with respect to the plane of the transparency at the point of incidence, such that the formed grating is free or artifacts such as are produced by lens aberrations or dust.

21. A method according to claim 20, wherein said first and second beams are provided by the steps of positioning a diffraction grating in contact with the transparency and directing a beam of coherent radiation onto the diffraction grating such that it is split into a zero order beam and into a first order diffracted beam, which beams are mutually coherent and form said first and second beams to provide said interference fringe field.

22. A method according to claim 21, wherein the step of providing the transparency includes the step of providing a black and white image as the optically discernable pattern.

23. A method according to claim 22, further comprising providing a succession of black and white images, each of which corresponds to a given color component of a multicolor image, each of said images being positioned in register with a preceding image and impinged upon with beams of coherent radiation of the same wavelength and at different angles.

24. A method according to claim 22, wherein the step of providing the transparency includes the step of providing a multicolored image as the optically discernable pattern, and wherein the photosensitive layer is selected to be sensitive to the colors in the transparency and to the wavelength of the beams of coherent radiation.

25. A method according to claim 22, further comprising directing additional pairs of mutually coherent beams of radiation having preselected wavelengths different from the wavelength of the first and second beams, which wavelengths are within the spectral sensitivity of the photosensitive layer, along non-colinear paths through separate spatial filters and thence directly onto the transparency at equal angles of incidence with respect to the plane of the transparency at the point of incidence such that coherent beams of a given wavelength intersect each other to form additional interference fringe fields in the region of intersection, whereby a hologram comprising an image of all of the interference fringe patterns superimposed on each other and amplitude modulated by the optically discernable pattern is formed, said patterns constituting a plurality of linear gratings, each of which has a preselected spatial frequency different from that of the other gratings.

26. A method according to claim 20, wherein the step of providing the transparency includes the step of positioning such a transparency in a plane whereat each of said beams impinges at a substantially constant angle over the entire area encompassed by the optically discernable pattern.

27. A system for forming a hologram including at least one linear grating having a preselected spatial frequency, said system comprising
  (a) means for providing a transparency containing an optically discernable pattern,
  (b) means for positioning a photosensitive medium in substantial contact with the transparency,
  (c) means for directing a first beam of coherent radiation having a predetermined wavelength to impinge on said transparency at a given angle with respect to the plane of the transparency at a given point, and
  (d) means for directing a second beam of radiation having the same predetermined wavelength as the first beam and coherent thereto to impinge onto said transparency at another angle with respect to the plane of the transparency at the point of impingement intersecting the first beam and forming an interference fringe field in the region of intersection,
  whereby there is formed in the photosensitive medium a hologram comprising a said linear grating having an image of the interference fringe pattern amplitude modulated by the optically discernable pattern in the transparency characterized by the feature that each of both said first and said second beams are directed along non-colinear paths through separate spatial filters and thence directly onto the transparency at equal angles of incidence with respect to the plane of the transparency at the point of incidence, such that the formed grating is free of artifacts such as are produced by lens aberrations or dust.

28. A method of forming a hologram including at least one linear diffraction grating having a preselected spatial frequency comprising the steps of
  (a) providing a transparency containing an optically discernable pattern,
  (b) positioning a transparent photosensitive medium in substantial contact with the transparency,
  (c) directing a first beam of coherent radiation having a predetermined wavelength along a first path through a spatial filter and thence to impinge directly on said transparency at a given point, and
  (d) directing a second beam of radiation having the same predetermined wavelength and coherent to the first beam along a second non-colinear path through a separate spatial filter and thence to impinge directly on said photosensitive medium, passing therethrough to interfere to form an interference fringe field in the region of intersection,
  whereby there is formed in the photosensitive medium a hologram comprising a said linear diffraction grating having an image of the interference fringe pattern amplitude modulated by the optically discernable pattern in the transparency which grating is free of artifacts such as are produced by lens aberrations or dust.

29. A method according to claim 28, wherein said first beam is directed onto said transparency substantially normal to the plane of the transparency at the point of incidence and said second beam is directed onto the photosensitive medium at an acute angle with respect to a line extending normal from the plane of the medium at the point of incidence, such that the photosensitive medium may be developed to provide surface modulations corresponding to a blazed grating.

30. A method of forming a hologram including a plurality of linear gratings, each of which has a spatial frequency different from that of the other gratings, comprising the steps of
  (a) providing a transparency containing a multicolored optically discernable pattern,
  (b) positioning a panchromatic photosensitive medium in substantial contact with the transparency,
  (c) directing two mutually coherent beams of radiation of a first predetermined wavelength along non-colinear paths through separate spatial filters and thence directly onto said transparency such that each beam of said first predetermined wavelength impinges onto said transparency at equal angles of incidence with respect to a line extending normal to the plane of the transparency at the point of impingement to result in an interference fringe field in the region of intersection and to thereby form on said photosensitive medium an image of the interference fringe field amplitude modulated by those portions of the multicolored optically discernable pattern corresponding to one color,
  (d) directing two mutually coherent beams of radiation of a second predetermined wavelength along non-colinear paths through separate spatial filters and thence directly onto said transparency such that each beam of said second predetermined wavelength impinges onto said transparency at equal angles of incidence to form on said photosensitive medium an image of the interference fringe field associated with the intersection of the beams of the second predetermined wavelength amplitude modulated by those portions of the multicolored optically discernable pattern corresponding to a second color, and
  (e) directing two mutually coherent beams of radiation of a third predetermined wavlength along non-colinear paths through separate spatial filters and thence directly onto said transparency such that each beam of said third predetermined wavelength impinges onto said transparency at equal angles of incidence to form on said photosensitive medium an image of the interference fringe field associated with the intersection of the beams of the third predetermined wavelength amplitude modulated by those portions of the multicolored optically discernable pattern corresponding to a third color.

31. A method according to claim 30, wherein step (d) includes the step of rotating the contacted transparency and photosensitive medium with respect to the incident beams to form said image of the fringe field associated with the beams of the second predetermined wavelength at an orientation different from that formed by the interference fringe field associated with the beams of the first predetermined wavelength, and wherein step (e) includes the step of further rotating with contacted transparency and photosensitive medium with respect to the incident beams to form said image of the fringe field associated with the beams of the third predetermined wavelength at a third orientation different from heat formed by the interference fringe fields associated with the beams of the first and second predetermined wavelengths.

32. A method according to claim 30, wherein step (d) includes directing said beams of said second predetermined wavelength along equal angles of incidence, which angles are different from the angles formed by the paths of said beams of said first predetermined wavelength, and wherein step (e) includes directing said beams of said third predetermined wavelength along equal angles of incidence, which angles are different from the angles formed by the paths of said beams of said first or second predetermined wavelength.

33. A method of forming a hologram including at least one linear grating having a preselected spatial frequency comprising the steps of (a) providing a sheet-like transparency containing an optically discernable pattern,
(b) positioning a photosensitive medium in substantial contact with one side of the transparency,
(c) positioning a diffraction grating in contact with the other side of the transparency, and
(d) directing a beam of coherent radiation having a predetermined wavelength onto the diffraction grating such that it is split into a zero order beam and a first order diffracted beam which is coherent with the zero order beam, whereupon the zero order beam impinges onto the transparency at a given angle with respect to the plane of the transparency at a given point, and the first order diffracted beam impinges onto said transparency at another angle with respect to the plane of the transparency at said given point, intersecting the zero order beam to form an interference fringe field in the region of intersection, whereby there is formed in the photosensitive medium a hologram comprising a said linear grating having an image of the interference fringe pattern amplitude modulated by the optically discernable pattern in the transparency.

* * * * *